May 6, 1941.  J. W. BRYCE  2,240,545
READING MACHINE
Filed Oct. 28, 1936   5 Sheets-Sheet 1

INVENTOR
James W. Bryce
BY
ATTORNEY

May 6, 1941. J. W. BRYCE 2,240,545
READING MACHINE
Filed Oct. 28, 1936   5 Sheets-Sheet 2

INVENTOR
James W. Bryce
BY
ATTORNEY

May 6, 1941.  J. W. BRYCE  2,240,545
READING MACHINE
Filed Oct. 28, 1936  5 Sheets-Sheet 3

INVENTOR
James W. Bryce
BY
ATTORNEY

May 6, 1941.     J. W. BRYCE     2,240,545
READING MACHINE
Filed Oct. 28, 1936      5 Sheets-Sheet 4

Patented May 6, 1941

2,240,545

UNITED STATES PATENT OFFICE 2,240,545

READING MACHINE

James W. Bryce, Glen Ridge, N. J., assignor to International Business Machines Corporation, New York, N. Y., a corporation of New York Application October 28, 1936, Serial No. 108,001

10 Claims. (Cl. 235—61.11)

This invention relates to reading character or indicia representations directly and converting such data to current indications for controlling purposes. More specifically, an object of the present invention relates to improvements in machines which are provided with arrangements adapted to create light ray images of such representations so as to cause by a comparing mechanism certain actions to be instituted thereby effecting the reading of such characters or indications.

Another object of the present invention relates to the provision of means for reading printed or formed characters by ray responsive means and to the provision of compensating means for reading the characters in the event that the said characters are not in perfect alinement or properly positioned on the character record retaining means or medium.

The present invention will be disclosed in certain preferred embodiments to illustrate the general principle thereof, whereby printed matter or data prepared by the usual typing, printing, or similar machines are read or scanned by means including light sensitive responsive devices, such as photo-cells, transforming the printed data to current values or indications to control certain types of translating, registering, or indicating devices. Broadly, the type of reading system just mentioned is well known at present and a common method of effecting this result is to compare the characters or indications of the record medium with like characters or indications borne by a comparing mask or member until complete arrangement of the characters is indicated; however, it has been found that when the usual printed or formed matter or data is to be read by the systems proposed, which are known by those skilled in the art, such known systems are impractical and of no value owing to the fact that compensating means for mis-alinement of the characters is not provided. It is well known that the characters printed, for example, by the usual typewriting or printing devices are not all allocated in the same plane, or that the spacing thereof may be irregular and varying, or in other words, the characters or indications are irregularly disposed on the record medium. In forming record sheets, there is no assurance that the spacing of the characters will be perfectly regular and that the position of the characters will always be in perfect vertical and horizontal alinement. Unless the characters on the record sheet are formed accurately and perfectly, that is, properly alined and equally spaced, and regularly disposed thereon, the present known reading systems would be inoperative due to the lack of compensating means for incorrect alinement or irregular disposition of the characters on the record sheets.

It was mentioned that one feature of the present invention is the provision of an improved reading machine and one including compensating means in such character reading system whereby indications or characters formed on a record medium but not perfectly alined or spaced may be read, instantaneously, irrespective of the disposition of the indications or characters thereon, to control associated indicating or manifesting devices.

The present invention is an improvement and modification of the reading system disclosed in a copending application, Serial No. 107,819, dated October 27, 1936. The system described in the said application, briefly and broadly, comprises a movable scanning device to compare the characters of the record sheet with like characters of the scanning or comparing device. The comparing member or device has disposed thereon all the characters which may appear on the record sheet. In addition thereto, a plurality of similar characters are disposed thereon which are slightly offset in a predetermined plane. The characters of the comparing member are offset in one direction and the said member is adapted to be rotatable in another direction, in this manner effecting scanning and alining of the character to be read in both the horizontal and vertical planes; that is, in the event the characters are disposed so as to be mis-alined in either plane, the device is effective to read said characters. The rotary comparing member is interposed between the record sheet and light responsive devices, so that upon agreement of the characters of the record sheet and comparing member, the light responsive devices are arranged to be operated, due to the modification of the light rays by the coincidence of the characters, to indicate such a condition. Upon operation of the light responsive devices, electronic elements are adapted to be activated to control associated mechanisms. The electronic elements comprise electrical discharge tubes of the type in which the discharge is started by a momentary application of a signal condition thereto, the discharge continuing independently of the applied signal condition until interrupted by an associated control means. In one form the electrical discharge tube may comprise a gas discharge path which is electrostatically controlled. A convenient form of discharge tube for such systems comprises a gas filled thermionic tube of such construction that when the anode is connected to positive battery and a certain potential is applied to the grid the tube will be activated and current will flow from the anode to the cathode. As soon as the plate current begins to flow, the grid is instantly surrounded by a sheath of positive ions and has no further effect in controlling the plate circuit; hence removal of the grid potential will not stop the plate current, once it is started, but it can readily be stopped by removing the plate voltage. The function of the grid may, therefore, be likened to a trigger. The amount of power required to start the tube is exceedingly small. A form of the thermionic tube having these characteristics set forth is disclosed in the Langmuir Patent No. 1,289,823 and commonly referred to as thyratron tubes. Operation of the tubes described then is adapted to cause the associated apparatus such as relay or control devices to be operated until the anode circuit of the discharge tube is opened. Several types of associated mechanisms are shown to be applied to the system in the said application, such as accumulator devices of well known statistical machines and devices such as adding machines, typewriters, and the like employing individual key levers for controlling purposes.

The present invention differs from the invention just described and disclosed in the aforementioned application, in that, instead of providing rotary comparing members and stationary lens systems and light responsive devices, the comparing mask or member is provided to be stationary and the lens system and light responsive devices are movable. The comparing mask is provided with the characters to be scanned and also a plurality of offset characters of similar characters to compensate for irregu- disposition of the characters on the record sheet. The reading of the characters is effected by focusing the image of the character on the record sheet on to the comparing mask and said image positioned so as to successively be impinged on the various characters on the comparing member. Upon agreement of the characters on the record sheet and member, photo-cell devices are rendered effective to trigger gas discharge tubes of the type described hereinbefore. The tubes continue to pass current in the anode circuit thereof until this circuit is opened which is effected near the end of the scanning cycle. Control elements are rendered operative due to the current flow in the said anode circuits, and may be employed to control any suitable indicating devices.

Certain modifications will appear during the description of the present invention and certain additional features will be described and mentioned which form part of the present invention.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

Figures 1, 7:
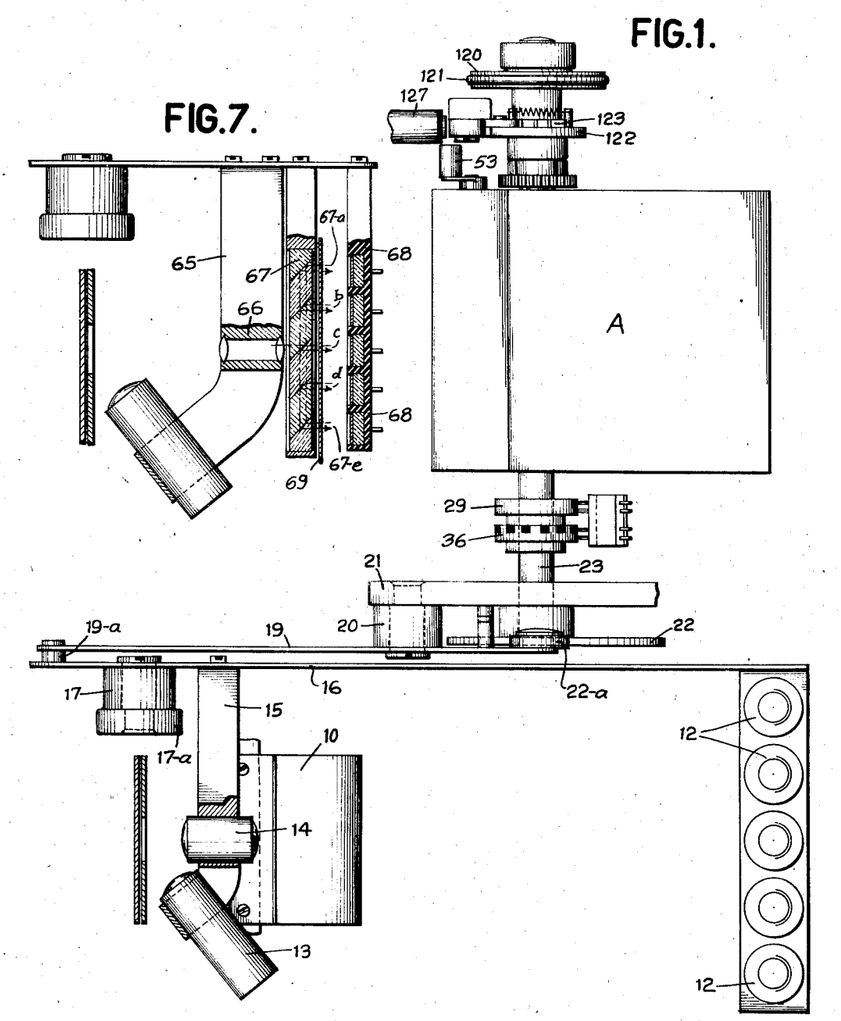
Fig. 1 is a plan view of the present invention showing a preferred embodiment thereof.
Fig. 7 is a partial sectional view of a modification of the mechanism.
Figures 2, 8:
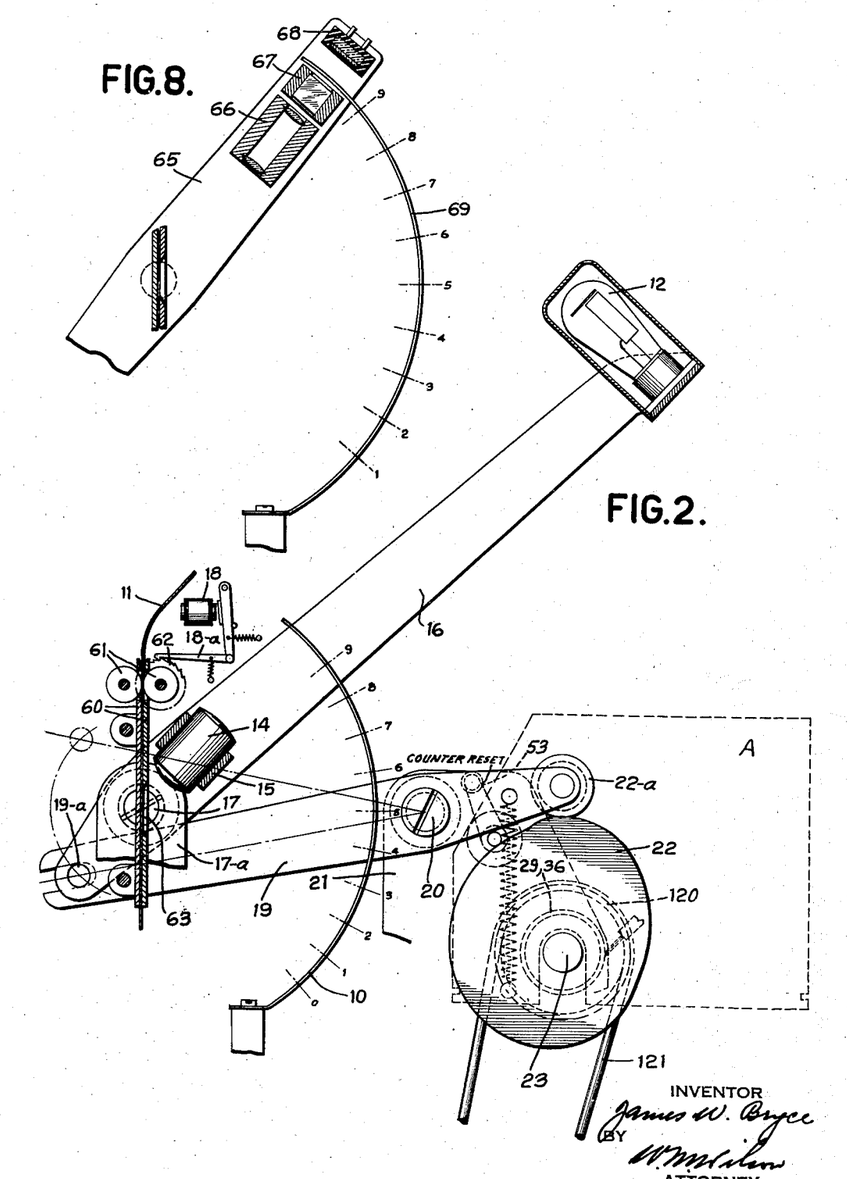
Fig. 2 is a vertical sectional view of the reading mechanism.
Fig. 8 is a detailed view of the prism system.
Figure 3:
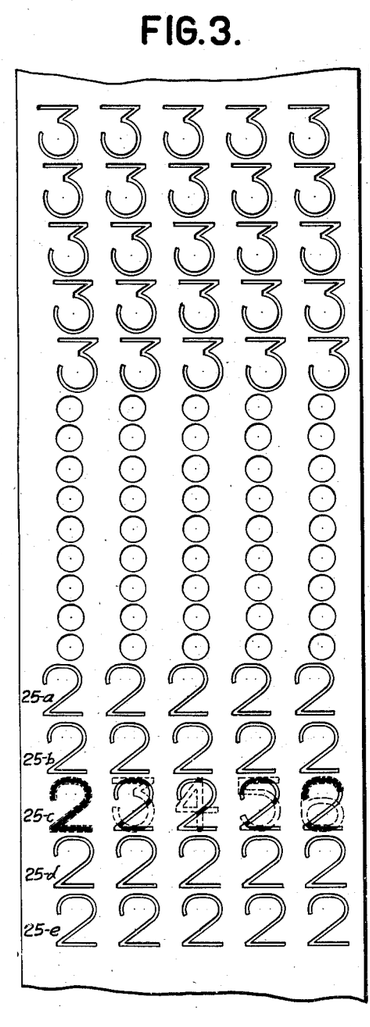
Fig. 3 and Fig. 4 are developed views of the comparing members.

Referring now to Figs. 1, 2, and 3, a comparing member or mask 10 is shown interposed between a record sheet 11 and a group of photo-cells 12 so that a light source 13 is adapted by means of the condenser system 14 to illuminate the record sheet and mask 10 whereupon the light rays impinge upon the photo-cells 12. The number of photo-cells employed corresponds to the number of columns desired to be read upon the record sheet. The stationary mask as shown, particularly in Fig. 3, comprises a plurality of orders of characters (the number thereof corresponding to the number of columns to be scanned or read) consisting of groups containing a plurality of similar characters; however, in each group the similar characters are slightly offset from one another, the purpose of which will be understood as the description progresses.

One method of effecting scanning of the characters disposed on the record sheet is shown specifically in Figs. 1 and 2. The light source 13 and lens system 14 are suitably mounted on arm 15 which may be an integral part of, or a separate extension fixed to, the arm 16. At one extremity of arm 16 the photo-cells are suitably mounted and near the other extremity thereof the arm is pivotally mounted on a suitably supported rod 17 (the supporting member designated 17—a). At the extremity of arm 16 a connecting pin 18—a secured thereto is adapted to cooperate with the bifurcated arm 19 which is pivotally mounted on rod 20, said rod suitably supported by member 21. The movement of arm 19 is controlled by cam 22 through the attached cam roller 22—a. Cam 22 is fixed to shaft 23 which is adapted to be rotated by any suitable means, one form as indicated by the belt 121 and pulley 120 and through the agency of a clutch mechanism shown in Fig. 10.

The record sheet 11 is positioned between the guide plates 60 and fed therethrough by the rollers 61, one of which is actuated step by step by ratchet wheel 62 and controlled by the paper feed magnet 18 and pawl 18—a so that upon energization and deenergization of the said magnet the record sheet is fed a distance equivalent to the spacing between the lines of characters disposed thereon. A sensing position is provided and is shown in the form of an opening 63 in one of the guide plates 60. The comparing mask or member 10 is suitably supported and interposed in a stationary position between the record sheet 11 and photo-cells 12. It is understood from the description thus far that arm 16 is positioned by means of cam 22 and the arm 19 so that the images of the characters on the record sheet are projected upon the fixed mask 10 and projected upon the mask so that the image passes over all the characters arranged on the mask, in the vertical plane, in succession, and that the entire group of characters on the mask is passed over by the image in the cycle; that is, the images projected by lens system 14 at the beginning of the scanning cycle are projected upon the first group at the uppermost position on the mask, and in the present example is the character "9" group. The images are then progressively projected from the "9" group of characters to the "8" group and so on to complete the scanning cycle by projecting the images to the character group positioned on the lower section of the comparing mask 10 (Fig. 2). Due to the configuration of the cam, during the remainder of the scanning cycle (see Fig. 5) the arm 16, carrying the lens system and photo-cells, is returned to the normal position shown in the figure.

Referring to Fig. 3, several of the orders of part of the characters of a group are shown. Five orders or columns of groups of characters are shown for illustrative purposes; it is obvious that the number of orders can be increased or decreased. Likewise, the number of similar characters shown in each group of characters is five for purposes of alinement. This number may be increased or decreased as seen fit. It is noted that the similar characters 25—a to e in one group of an order are staggered slightly vertically. The purpose of this arrangement is to provide a method of matching the characters of the comparing member with the characters on the record sheet even though the characters on the record sheet are not in perfect alinement or properly and regularly spaced, or in other words, the characters are irregularly disposed thereon. It is obvious that with this method of scanning, even though the characters on the record sheet are displaced or mis-alined in the horizontal plane, it is possible to match the character thereon due to the arrangement of the offset characters on the comparing mask. It is evident too since the images are projected successively from one group of characters to the next group of characters in the vertical plane that the matching of characters displaced or mis-alined in the vertical plane is effected.

In Fig. 3 it is shown how the character "2" in one order is matched with one of the characters "2" of the group in the corresponding order on the comparing mask. The character group on the record sheet to be read or scanned is 23456. As the "3" image is presented to the five characters in the "3" group of that order one of the characters of the group on the mask will correspond perfectly with the character "3" image projected thereon, and similarly with the remaining characters in the other orders, as the image is caused to pass thereover.

Figure 6:
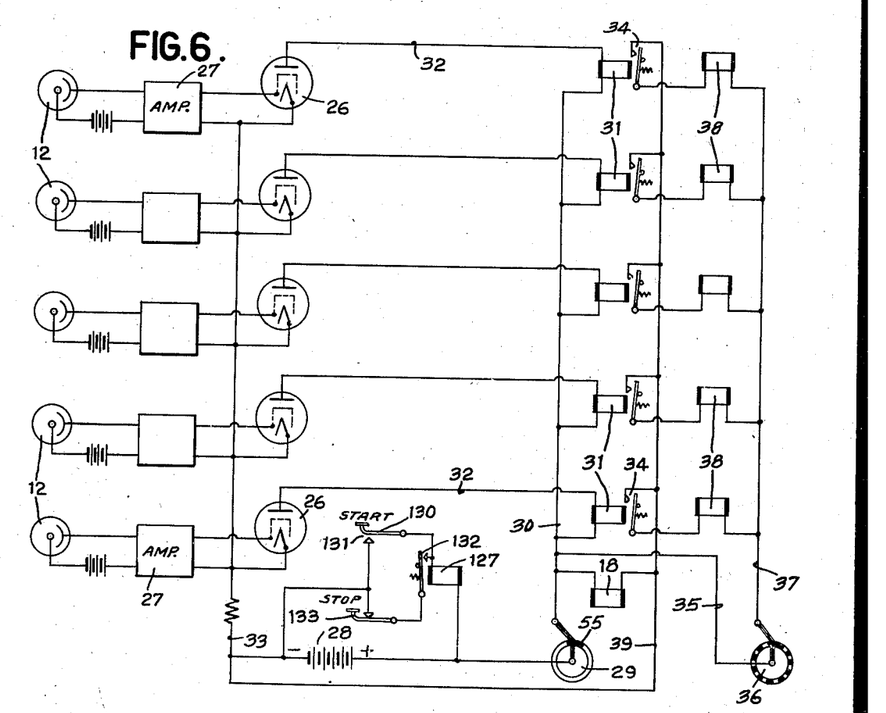
Fig. 6 is one form of circuit diagram embodying the principles of the invention.

When the characters on the comparing mask and the characters on the record sheet match or correspond, due to the projection of the image, the minimum amount of light is permitted to be impinged on the corresponding photo-cell 12. In this description it is assumed that the characters on the comparing member are either transparent or merely openings in an opaque mask. Referring now to Fig. 6, the photo-cell and amplifier circuits are so arranged that when the minimum amount of light falls upon the photo-cell, the grid of the electrical discharge tube 26 of the type described hereinbefore is triggered to permit current to flow in the anode circuit thereof. These types of controlling circuits are well known and it is deemed not necessary to describe them further. To continue with the example, let it be assumed that the "2" character on the record sheet is matched with the "2" character on the comparing member to permit the minimum amount of light to fall upon the photo-cell to operate the corresponding photo-cell circuit and amplifier unit 27 to trigger the grid of the electric discharge tube 26 to permit current to flow in the plate circuit thereof which is as follows: the positive terminal of battery 28, control commutator 29 (secured to shaft 23), conductor 30, coil of relay 31, conductor 32, anode and cathode of tube 26, conductor 33 to battery 28. Current flows in the circuit traced until the plate circuit is opened, irrespective of the duration of the grid condition of the tube.

Figure 5:
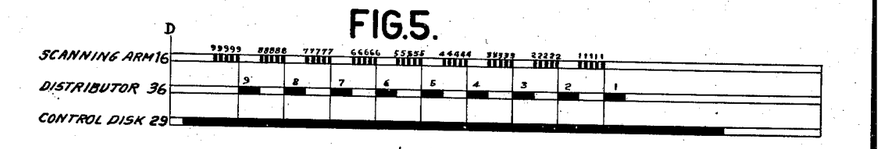
Fig. 5 is a timing chart for the present invention.

Referring now to Fig. 5 representing a timing chart, it is seen that the thyratron control unit is closed practically the entire machine cycle, a complete cycle as represented is equivalent to a complete revolution of the main drive shaft 23; therefore, due to the current flow in the plate circuit just described, relay 31 is energized and remains energized until the control commutator 29 opens the said plate circuit.

Energization of relay 31 operates its associated contacts 34 to establish the following circuit: positive pole of battery 28 to control commutator 29, conductors 30 and 35, impulse distributor (secured to shaft 23), conductor 37, coil of relay 38, contacts 34 of relay 31 and conductor 39 to negative pole of battery, energizing relay or magnet 38. The energized relay or magnet 38 may represent any desired type of controlling element to control any suitable indicating or registering means representing the condition just described namely, that the characters of the record sheet and the particular character of the comparing mask correspond. A particular type of controlled device will now be explained which may be used in the reading system described. The relay or magnet 38 represents, in the example to be set forth, the control element of a well known statistical machine. The application in this instance may be such that it is desired to enter an amount in an item entering means or accumulator in accordance with the character disposed on the record sheet and read by the described reading system.

Figure 10:
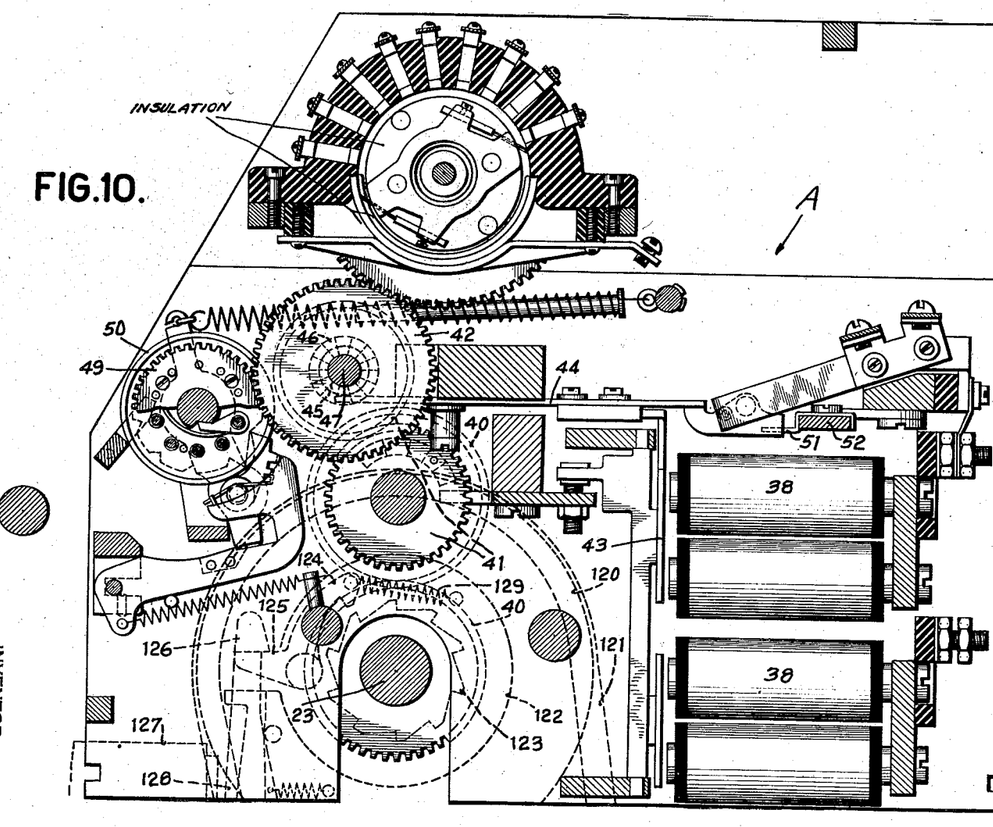
Fig. 10 is a sectional view of one form of a controlled device which may be used with the invention.

Referring now to Fig. 10, the operation of the item entry means, generally designated "A," will be briefly described. This unit is well known in the art and requires no detailed description; for a detailed description, reference may be made to Patent No. 1,976,617. Magnet 38 may be energized at various points in the cycle of the machine, depending upon the timed interval of the matching of the characters of the record sheet and comparing mask. Energization of the magnet 38 attracts the armature 43 to displace the attached lever 44, causing the latching member 45, slidably mounted on shaft 47, to engage the member 46 integral with gear 42 loosely mounted on the shaft 47. Gear 42, when thus coupled to shaft 47, is rotated thereby through the gearing thereto from the main shaft 23 and indicated generally as gears 40 and 41, and gear 42 causes the rotation of gear 49 to displace the accumulator index wheel 50.

Therefore, it is seen by referring to the timing chart in Fig. 5, that, if during the scanning cycle the characters "9" are matched, the magnet 38 is energized through the "9" segment of the impulse distributor 36, thereby permitting the index wheel to be rotated for the remaining period of the accumulator cycle. An accumulator cycle is equivalent to the scanning cycle for one complete set of characters disposed on the comparing mask. It is to be understood that an individual controlling magnet is provided for each order of the item entry or accumulating means as indicated in Fig. 6. It is to be noted that on the comparing mask between the groups of similar characters a space is allotted; it is during this timed interval as shown on the timing chart that the magnets or control elements are energized. The spaced portions are slotted or provided with openings, as shown to permit the photo-cells to be illuminated between scanning periods so as to prevent faulty energization of the associated photo-cell circuits.

It is understood from the description thus far that upon energization of the magnet 38, indicating that the characters of the record sheet and mask correspond, the controlled device such as described, namely, the item entry means or accumulator, is displaced or operated continuously until the end of the scanning or accumulating cycle, at which time the clutch element 45 is de-clutched by a finger 51 carried on a bar 52. This operation of the accumulator is well known and is explained fully in the cited patent and needs no further description. The usual resetting means for the accumulator is indicated generally at 53 and may be manually operated. Near the end of the machine cycle and upon completion of the scanning and item entry cycle, the control distributor 29 by means of the insulated segment 55 (Fig. 6) causes the plate circuit described to be opened thereby restoring the discharge tube 26 to a normal inoperative condition and thereby deenergizing the relay 31. The magnet 38 is deenergized due to the elongated insulated segment on the impulse distributor 36, at the end of the item entry cycle (Fig. 5). It is seen that near the beginning of the machine cycle, the magnet 18 is connected directly across the battery 28 by means of the control distributor 29 and near the end of the cycle is deenergized thereby to operate the said magnet to perform preparatory functions of the machine such as, for example, operating the paper feed device described hereinbefore to present the next line of characters on the record sheet to the sensing position.

From the description thus far it is understood that all of the orders or columns of characters disposed on a line on the record sheet are read simultaneously and the controlled device is operated in accordance therewith. Continuing, all the orders of the accumulator are operated and the amounts are entered therein simultaneously in each order to correspond to the characters read on the record sheet. Due to the arrangement of the similar characters of each group in each order, it is seen that even though the characters are mis-alined or unequally spaced the reading system described is effective to operate the controlled device in accordance with the items or characters disposed on the record sheet.

It should be mentioned at this time that it is preferred to start all the controlling elements of the system in unison, such as the lens and photocell system, control distributors 29 and 36, and the accumulating or similarly controlled device; that is, to start the said control elements from a normal starting position such as the "D" position indicated in Fig. 5.

For this reason as mentioned hereinbefore, the control elements are actuated by the main driving shaft 23. The cam 22 is secured thereto and also the various control distributors 29 and 36. The controlled device, namely, the accumulator, is actuated by the said shaft through the gearing 40 and 41. Referring to Fig. 10, a driving element such as pulley 120 and a clutch operating member 123 integral therewith are rotatably mounted on shaft 23 and continuously rotated by any suitable means through the means such as belt 121. A suitable supporting member 122 for the dog 124, which is pivotally mounted thereon, is fixedly secured to shaft 23. The member 122 and dog 124 have protruding fingers such as indicated by reference character 125 and are adapted to be engaged by the stop 126 which is in extension of armature 128 when the parts are in position as indicated in the figure. When the clutch magnet 127 is energized to attract its armature 128, the stop 126 releases the member 122 and dog 124 so that by means of spring 129, the dog is caused to engage the clutch member 123 to be continuously rotated thereby causing the shaft 23 to be rotated.

With reference to Fig. 6, the machine is started by depressing the start key 130 to close the associated contact 131 connecting the magnet 127 directly across the battery. Energization of the said magnet causes the contacts 132 to be closed to establish a locking circuit for the magnet through the normally closed contacts of the stop key 133, maintaining the magnet energized until the stop key is operated to open the contacts in the locking circuit. Energization of magnet 127 causes the clutch to connect the driving member 123 to the member 122 by dog 124 to rotate the shaft 23. Upon operation of the stop key 133 the magnet is deenergized so as to position the stop 126 in the path of the fingers 125 causing the dog 124 to be disengaged from the clutch member 123, thus causing the controlling elements of the machine to be stopped in the said "D" position.

From the description thus far, it is understood how the scanning of the characters on a record sheet is effected, by progressively projecting the images of the characters to be compared upon a stationary mask having all the characters to be read disposed thereon. In addition thereto, a plurality of offset characters are provided on the mask so as to effect comparison of all characters even though said characters may be irregularly disposed upon the record sheet. The images of the characters are projected along the entire group of the characters during a predetermined timed interval representing a scanning cycle. When the characters on the mask and the record sheet correspond, the corresponding photo-cells are responsive accordingly to trigger the associated discharge tubes to operate the corresponding controlling elements in accordance with the characters read.

Figure 4:
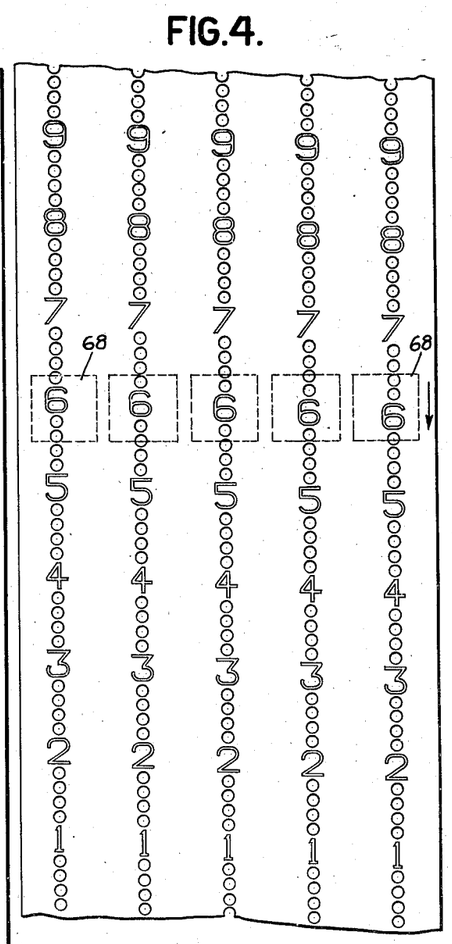

Referring now to Figs. 4, 7, 8, and 9, a modification of the present invention will be described. The movable arm 65 is positioned in exactly the same manner as described for arm 16 (Fig. 2) and is similar to said arm with the exception of the modification to permit the mounting of a lens system 66, a prism system 67, and the associated photo-cells 68 as shown in the figures. The character images projected by the lens system 66 are impinged upon a prism system 67 comprising a plurality of prism blocks arranged to break up the original beam of light or image into a plurality of separate beams or images as indicated at 67—a to e. The said images are then projected upon the comparing mask 69 to compare the characters read with the sensed characters on the said comparing mask. The design of the mask 69 is shown in Fig. 4 and differs somewhat from the mask 10 described hereinbefore. All the characters which may appear on the record sheet are disposed on the mask, and similarly as before, a plurality of similar characters arranged to be offset are provided for each different character designation as shown. The purpose of the character arrangement on the mask 69 is to provide means for effecting reading of a character instantly by projecting a plurality of images of the character to be read upon the several orders of characters appearing on the mask, irrespective of the disposition of the character on the record. The characters on the mask are displaced vertically with respect to each other in the different orders to compensate for the possible misalignment of the characters to be read. In this example the same number of photo-cells are provided to correspond to the number of beams of light generated by the prism system and to the number of similar characters provided in an offset manner for each character designation.

Figure 9:
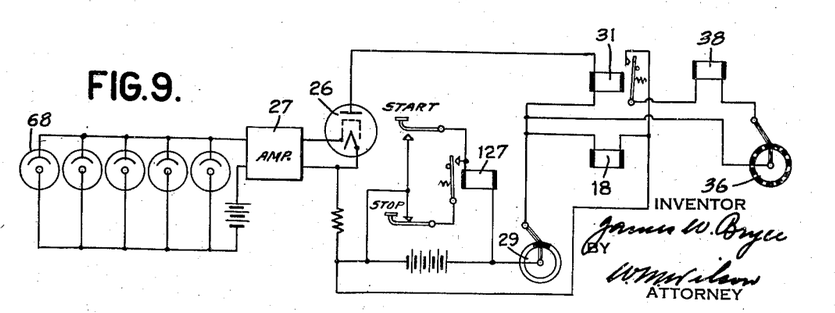
Fig. 9 is the circuit diagram showing the control element for the modification.

As shown in Fig. 8 the mask 69 is suitably supported so as to be stationary and the arm 65 carrying the lens and prism systems and the photo-cells is adapted to be positioned by the cam mechanism (see Fig. 2) described, so that the plurality of separate images are projected on the mask and as the arm 65 is moved downwardly to determine correspondence of the characters the images progressively are projected upon the various groups of characters. Upon the matching of the characters one of the photo-cells 68 corresponding to the particular character group and depending upon the alinement of the character on the record sheet is operated to trigger the discharge tube 26 to energize the relay 31 and the controlling magnet 38 (Fig. 9) to control the accumulator device (Fig. 10) so that the character is properly entered therein. The operation of the circuit in Fig. 9 is exactly the same as the circuit shown in Fig. 6 which was described hereinbefore and need not be repeated at this time. The description of the modification just set forth related to the sensing or reading of a single column or order of characters which may be irregularly disposed on the record sheet, merely to set forth the principle of the modification as briefly as possible.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a reading device of the character described controlled by a record medium having various characters disposed thereon, a stationary comparing member having all the characters to be read disposed thereon, a work circuit, means for projecting the image of the character to be read progressively from one character on the stationary comparing member to another, and means controlled upon correspondence of one of the characters disposed on the said comparing member and the character image projected thereupon for influencing the said work circuit.

2. In a reading device of the character described controlled by a record medium having various characters disposed thereon, a comparing member having all the characters to be read disposed thereon, means for maintaining the member in a fixed position at all times, an indicating device and control means therefor, means for projecting the image of the character to be read progressively upon the characters disposed on the said comparing member, and means for controlling the indicating device control means upon correspondence of one of the characters disposed on the said comparing member and the character image projected thereupon thereby controlling the indicating device to indicate the compared like characters.

3. In a reading device of the character described controlled by a record medium having various characters disposed thereon, a comparing member having all the characters to be read disposed thereon, means for maintaining the member in a fixed position at all times, means including a projecting system for projecting the image of the character to be read progressively upon the characters disposed on the said comparing member, and means for indicating a condition of coincidence of one of the characters disposed on the comparing member and the character image projected thereupon.

4. In a reading device of the character described controlled by a record medium having various characters disposed thereon, a comparing member having all the characters to be read disposed thereon, means for maintaining the member in a permanently fixed position, means for projecting the image of the character to be read progressively upon the characters disposed on the said comparing member, indicating means, and means operating in timed relationship with the projecting means for controlling the operation of the indicating means upon correspondence of one of the characters disposed on the said comparing member and the character image projected thereupon.

5. In a reading device of the character described controlled by a record medium having various characters disposed thereon, a comparing member having all the characters to be read disposed thereon, means for maintaining the member in a permanently fixed position, means for projecting the image of the character to be read progressively by radiant energy upon the characters disposed on said comparing member, and means influenced by the radiant energy upon correspondence of one of the characters disposed on the said comparing member and the character image projected thereupon.

6. In a reading device of the character described controlled by a record medium having various characters disposed thereon, a comparing member having all the characters to be read disposed thereon, means for maintaining the member in a permanently fixed position, means for projecting the image of the character to be read progressively upon the characters disposed on said comparing member, a work circuit, and means operating in timed relationship with the progressive projection of the said image for influencing at a particular time interval the work circuit upon the comparison of like characters, the particular time interval at which the work circuit is influenced depending upon the identity of the character image projected upon the characters on the comparing member.

7. In a reading device of the character described controlled by a record medium having various characters disposed thereon, which characters may be irregularly disposed thereon in different positions, other than the normal positions where they should appear, a stationary comparing member bearing a plurality of groups of characters which appear on the medium, the said characters of each group being identical and arranged in a predetermined relationship with respect to each other, the predetermined relationship of the arranged characters in the group determining the extent of irregular disposition of the characters which can be compensated for by the said groups of characters formed on the comparing member, means for projecting by radiant energy the image of the character to be read progressively upon the said groups of characters disposed on said comparing member, and means influenced by the radiant energy when correspondence of one of the characters in the said groups of characters disposed on the member and the character image projected thereupon is effected, thereby determining the identity of the character to be read regardless of its disposition on the medium.

8. In a reading device of the character described controlled by a record medium having various characters disposed thereon, which characters may be irregularly disposed thereon in different positions other than the normal positions where they should appear, a stationary comparing member bearing a plurality of groups of characters which appear on the medium, the said characters of each group being identical and arranged in a predetermined relationship with respect to each other, the predetermined relationship of the arranged characters in the group determining the extent of irregular disposition of the characters which can be compensated for by the groups of characters formed on the comparing member, means for projecting the image of the character to be read progressively upon the characters disposed on said comparing member, a work circuit, and means operating in timed relationship with the progressive movement of the projected character image for influencing the work circuit at a predetermined time when correspondence of one of the characters disposed on the member and the character image projected thereupon is effected, thereby determining the identity of the character to be read regardless of its disposition on the medium, the said predetermined time at which the work circuit is influenced depending upon the identity of the character image projected upon the characters on the comparing member.

9. In a reading device of the character described controlled by a record medium having various characters disposed thereon, which characters may be irregularly disposed thereon in different positions other than the normal positions where they should appear, a comparing member bearing a plurality of groups of characters which appear on the medium, the said characters of each group being identical and arranged in a predetermined relationship with respect to each other, the predetermined relationship of the said characters in each group determining the extent of irregularity of the disposition of the characters on the medium which can be compensated for by the said groups of characters formed on the comparing member, means for projecting images of the character to be read progressively from one group of characters on the member to another including means for effecting the projection of an image of the character to be read simultaneously on each of the characters of the said group of characters, and means for indicating a condition of coincidence of one of the characters of the said groups disposed on the comparing member and one of the character images projected thereupon thereby indicating the identity of the character to be read regardless of its disposition on the medium.

10. In a reading device of the character described controlled by a record medium having various characters disposed thereon which characters may be irregularly disposed thereon in different positions other than the normal positions where they should appear, a comparing member bearing a plurality of groups of characters which appear on the medium, the said characters of each group being identical and arranged in a predetermined relationship with respect to each other, the predetermined relationship of the said characters in each group determining the extent of irregularity of the disposition of the characters on the medium which can be compensated for by the said groups of characters formed on the comparing member, means for comparing the character to be read progressively with each group of characters formed on the comparing member for determining the identity of the character to be read, said comparing means including the combination of means for effecting comparison of all the said characters of each group on the member simultaneously with the character to be read, and of means for indicating a condition of correspondence between one of the characters of the said groups and the character compared therewith.

JAMES W. BRYCE.